(12) United States Patent
Neubauer

(10) Patent No.: US 10,569,974 B2
(45) Date of Patent: Feb. 25, 2020

(54) LINEAR TRANSPORT SYSTEM WITH MINIMAL TRANSPORT SPACING

(71) Applicant: Krones AG, Neutraubling (DE)

(72) Inventor: Michael Neubauer, Grassau (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 15/776,349

(22) PCT Filed: Dec. 8, 2016

(86) PCT No.: PCT/EP2016/080189
§ 371 (c)(1),
(2) Date: May 15, 2018

(87) PCT Pub. No.: WO2017/108421
PCT Pub. Date: Jun. 29, 2017

(65) Prior Publication Data
US 2019/0256302 A1     Aug. 22, 2019

(30) Foreign Application Priority Data
Dec. 21, 2015   (DE) .......................... 10 2015 226 141

(51) Int. Cl.
*B65G 54/00* (2006.01)
*B65G 54/02* (2006.01)
(Continued)

(52) U.S. Cl.
CPC ............... *B65G 54/02* (2013.01); *H02K 7/08* (2013.01); *H02K 41/031* (2013.01);
(Continued)

(58) Field of Classification Search
None
See application file for complete search history.

(56) References Cited

U.S. PATENT DOCUMENTS

| 5,749,131 A | 5/1998 | Breil et al. |
| 7,086,525 B2 * | 8/2006 | Kilby ..................... A21C 13/02 |
| | | 198/800 |

(Continued)

FOREIGN PATENT DOCUMENTS

| CN | 1 914 103 B | 12/2012 |
| DE | 195 10 281 C1 | 12/1995 |

(Continued)

OTHER PUBLICATIONS

International Search Report and Written Opinion dated Mar. 15, 2017, on application No. PCT/EP2016/080189.
(Continued)

*Primary Examiner* — Kavel Singh
(74) *Attorney, Agent, or Firm* — Lowenstein Sandler LLP

(57) ABSTRACT

A transport system for the transport of containers in a container treatment facility includes a transport track with at least one long stator of a linear motor and multiple transport elements for transporting one or multiple containers. The transport elements are arranged movably on the transport track and formed to be guided along the transport track through magnetic interaction with the at least one long stator. The front and back sides of the transport elements are formed to driven into one another at least in pairs and to have a minimal attainable transport spacing that is smaller than the longitudinal extension of the transport elements.

20 Claims, 8 Drawing Sheets

(51) Int. Cl.
   *H02K 7/08*   (2006.01)
   *H02K 41/03*  (2006.01)
   *H02N 15/00*  (2006.01)

(52) U.S. Cl.
   CPC .......... *H02K 41/033* (2013.01); *H02N 15/00* (2013.01); *B65G 2201/0247* (2013.01)

(56) References Cited

U.S. PATENT DOCUMENTS

| | | | |
|---|---|---|---|
| 7,168,556 B2* | 1/2007 | Spoeler | B62D 65/18 |
| | | | 198/465.2 |
| 8,827,071 B2 | 9/2014 | van de Loecht | |
| 9,555,720 B2* | 1/2017 | Aumann | B65G 54/02 |
| 9,604,795 B2* | 3/2017 | Aumann | B65G 54/02 |
| 9,617,089 B2* | 4/2017 | Josefowitz | B60L 13/003 |

FOREIGN PATENT DOCUMENTS

| | | |
|---|---|---|
| DE | 10 2010 027925 A1 | 10/2011 |
| DE | 10 2013 218 389 A1 | 3/2015 |
| EP | 0 820 862 A | 1/1998 |
| EP | 2 889 238 A1 | 7/2015 |
| JP | H05 51087 A | 3/1993 |
| JP | H10 17125 A | 1/1998 |
| WO | 2011/131386 A1 | 10/2011 |

OTHER PUBLICATIONS

Chinese Office Action dated Aug. 7, 2019 on application No. 2016-80068522.

* cited by examiner

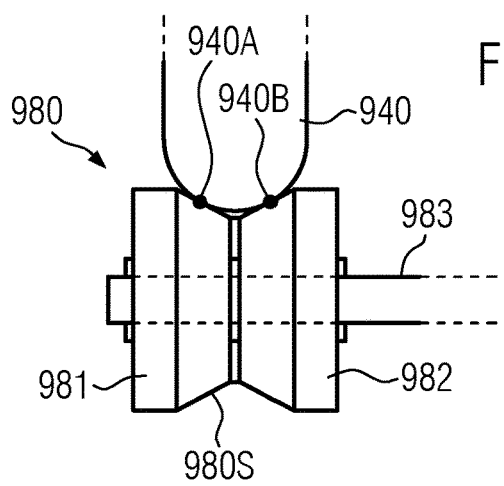
FIG. 8
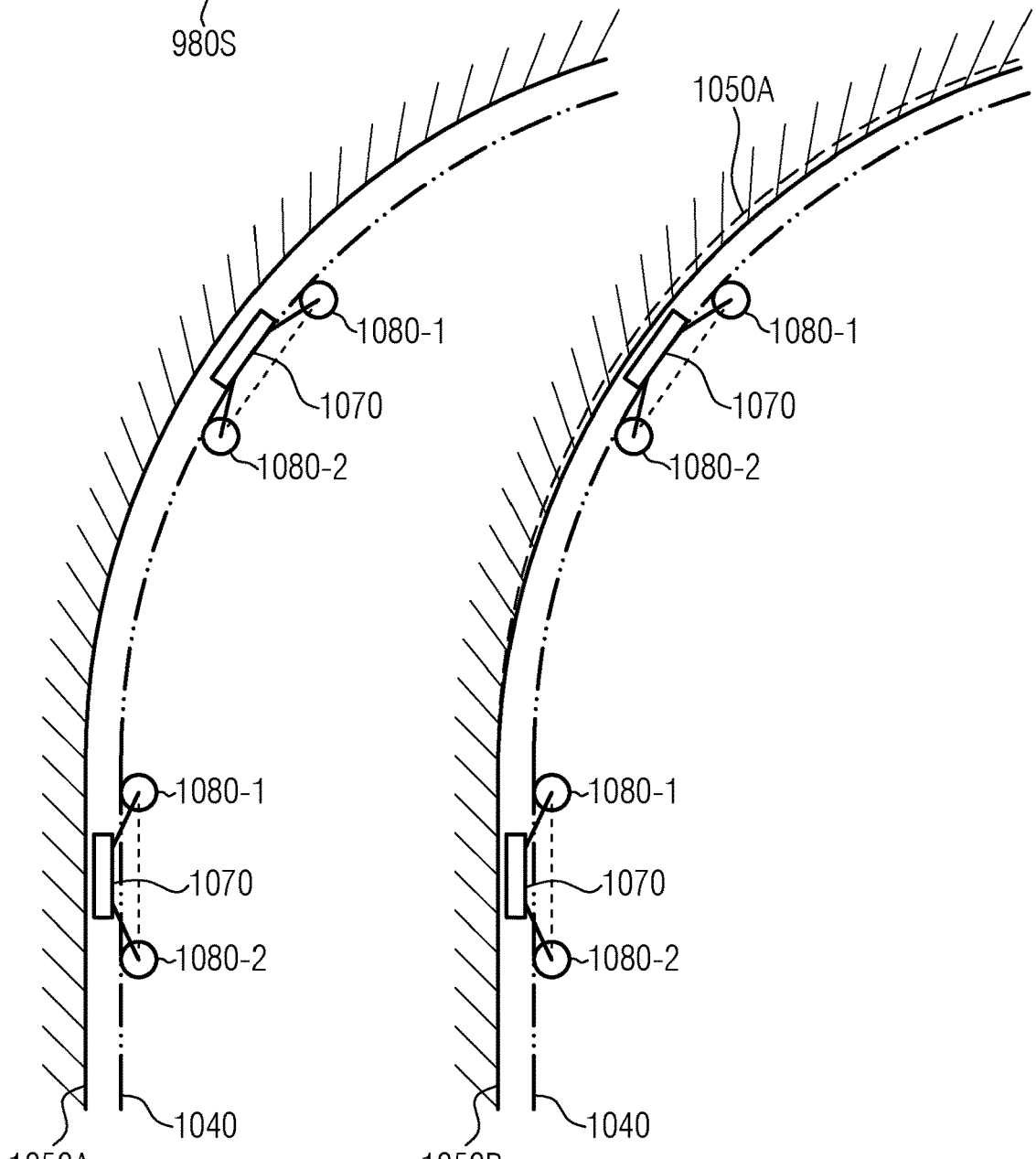
FIG. 9A
PRIOR ART
FIG. 9B

LINEAR TRANSPORT SYSTEM WITH MINIMAL TRANSPORT SPACING

RELATED APPLICATIONS

This application claims the benefit under 35 U.S.C. § 371 of International Patent Application No. PCT/EP2016/080189, filed Dec. 8, 2016, which claims the benefit of German Patent Application No. 10 2015 226 141.7, filed Dec. 21, 2015, which are incorporated by reference in their entirety.

TECHNICAL FIELD

The present disclosure relates to a device for controlled moving of individually controllable transport elements for transport (e.g., for pushing, slowing down, distributing, discharging, etc.) of containers or of container accessories (e.g., closures or labels of bottles or cans) in a device for treatment of the containers.

BACKGROUND

Transport systems with a linear motor drive, i.e. linear transport systems, are well known in the state of the art. The most prominent example is a high-speed passenger train on the basis of magnetic levitation technology. Transport systems with a linear motor drive, however, are also used in many industrial fields (e.g., for individual transport of piece items within production lines).

For example a linear transport system with a plurality of magnetic rotors for the transport of bottles in a container treatment device is described in the DE 10 2013 218 389 A1. In this context, the rotors that transport the bottles move in a way as to be driven by the magnetic interaction between a secondary part of the rotors that carry a permanent magnet and/or electromagnets and two long stators along two guiding rails that are guided in parallel and that are connected to the respective long stator. The rotors are thereby supported on the guiding rails and generally have a chassis with a rectangular form on the plane of the roller bearings, wherein roller pairs, which are only spaced slightly from one another, encroach on the respective guiding rail in the longitudinal direction of the rotors.

In practice, there are contradictory requirements for the design of the rotors. On one hand, the rotors should have an extension as small as possible in the longitudinal direction, i.e. in the movement direction, so that the distance of the containers or objects to be transported by them, i.e. the transport spacing, is as small as possible in the container flow to be formed and hence that the throughput of containers per time unit of a container treatment facility that uses the transport system can be as high as possible. If each rotor transports exactly one container, there will for example be the minimal attainable spacing if successive rotors drive in a way as to be in contact with one another. This minimal attainable spacing therefore corresponds to the maximum longitudinal extension of the rotors, provided that the containers are smaller than the rotors. Likewise, a small longitudinal extension of the rotors is desirable to be able to input small containers in the piled-up state at a transition point by a transport belt.

Conversely, it is desirable to form the rotors as long as possible in order to reduce wear and stress of the bearing elements, in general of the rollers. In addition, the rollers for a long rotor can be formed smaller than for a short rotor. Alternatively, the rotor can take on a higher load if the bearing elements are dimensioned identically.

In the transport systems known in the state of the art, the guiding rails for the bearing elements of the rotors and the long stators of the linear motors extend in parallel to one another. This is also the case in the area of curves, which is generally no problem for rotors in which the rollers along the respective guiding rail are located at a close distance to one another. However, if we seek to equip the rotors with an increased roller spacing in the longitudinal direction for the reasons mentioned above, the geometric proportions of the magnetic drive will change when driving into curves. Due to the inevitable overlaps, the distance between the secondary part of the rotor and the long stator is increased or reduced, depending on whether the curve is an inside or an outside curve. For functional reasons, however, it is desirable that this distance, and/or more specifically the width of the air gap between the magnets of the secondary part and the magnets, i.e. the coils and/or the iron cores of the coils, of the long stator remains constant during the entire ride because a change of this distance would lead to a significant change of the normal and propulsion forces onto the rotor.

BRIEF DESCRIPTION OF THE DRAWINGS

Embodiments of the present disclosure are illustrated by way of example, and not by way of limitation, in the figures of the accompanying drawings.

FIG. 8 schematically illustrates a gothic guiding roller, according to certain embodiments.

FIG. 9A illustrates parallel guiding of the guiding rail and the long stator as it is known in the state of the art.

FIG. 9B illustrates a curve piece of the transport track with a deviation from the parallel guiding, according to certain embodiments.

DETAILED DESCRIPTION

Figure 1:
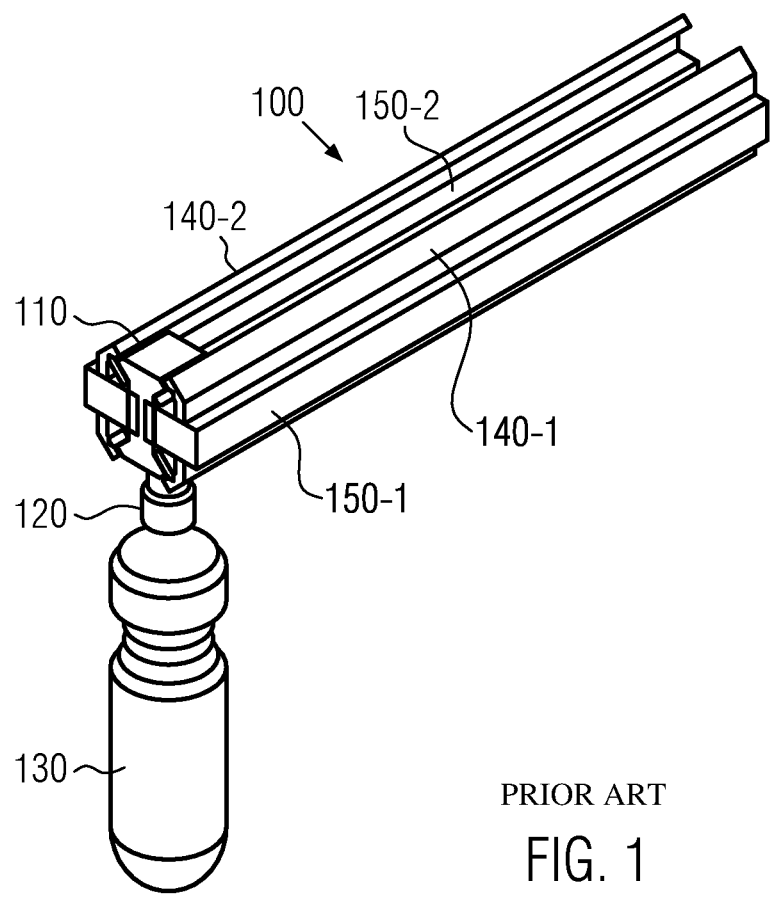
FIG. 1 illustrates a transport system with a two-sided linear motor and transport element as it is known in the state of the art.

The present disclosure addresses the problem of providing a linear transport system that allows for a transport spacing that is as small as possible without having negative effects regarding wear and stress of the bearing elements. In addition, a linear transport system, which enables normal and propulsion forces along the entire transport track that are as constant as possible, should be provided. In general terms, the present disclosure addresses the problem of increasing the throughput of a linear transport system while ensuring a low maintenance workload.

The abovementioned problems are solved by a transport system for the transport of containers in a container treatment facility, with a transport track with at least one long stator of a linear motor and multiple transport elements for transporting one or multiple containers, wherein the transport elements are arranged movably on the transport track and formed in such a way that they can be guided along the transport track through magnetic interaction with the at least one long stator, and wherein the front and back sides of the transport elements are formed in such a way that the transport elements can be driven into one another at least in pairs and to the extent that there will be a minimal attainable transport spacing that is smaller than the longitudinal extension of the transport elements.

In case of container treatment facilities, containers such as bottles, cans, etc. are treated in one or multiple successive process steps. In this process, the process steps and/or working steps are generally performed in separate treatment units that can for example be composed as modules of a joint facility concept. A container treatment facility for plastic bottles (e.g., for example made of polyethylene terephtalate (PET), polypropylene (PEP), etc.) can for example include a heating device for heating of the preforms, a stretch-blowing device for expanding and stretching of the preforms into plastic bottles, a cleaning device, a labeling device, a filling device, a sorting device, a packaging device, a sterilization device, an inspection device, a tempering device, a cooling device, a coating device, a buffer device, etc. as separate treatment units that are designed in a modular way. In this context, the individual treatment units, which perform successive process steps, are generally switched successively in a row, wherein one or multiple transport devices ensure the transport of the containers from the treatment units to the respective treatment units that are arranged downstream of said treatment units. It is also conceivable to bundle multiple ones of the abovementioned process steps in one treatment unit. For example, it is possible to provide treatment units for combined expanding and filling or filling and sealing of containers.

The present disclosure relates to such a transport system for the transport of containers in a container treatment facility. For the transport of the containers along a process track in a container treatment facility, the transport system according to the disclosure includes a plurality of transport elements for transporting one or multiple containers, wherein the transport elements are arranged movably on a transport track of the transport system. There can in principle be any number of transport elements on the transport track with said number being only limited by the length of the transport track. For the intake of at least one container at an input and for discharge of the containers at an output, the transport elements can be equipped with an appropriate holding device for holding one or multiple containers, e.g. in form of a gripping element. The gripping element can be formed in a way as to be controllable passively or actively. Gripping elements (e.g. neck handling brackets) may be for form-fitting or force-fitting gripping of a neck area of the containers (e.g., for neck handling of plastic bottles). The held container can be supported in the gripping element in a way as to be rotatable around its longitudinal axis during form-fitting gripping. In addition, the gripping element can be formed in a way as to be tiltable and/or height-adjustable. It is also conceivable to treat containers that are transported on a transport belt with the present disclosure. In this context, treatment shall be understood as a process of slowing down and/or accelerating containers in relation to the transport track. This enables an increase or a reduction of the distances of the containers to one another during transport.

Containers may be beverage bottles or other containers (e.g., for foodstuffs, medicines, hygiene articles, cleaning agents or the like). Containers may be cans, glass bottles or other glass containers with a lid, packagings on the basis of cardboard or composite materials such as tetra pack or the like. Likewise, intermediate products (e.g., preforms for stretch-blowing of the containers) are conceivable in case of plastic containers. In addition, also composed bundles with multiple containers shall be understood as containers.

The transport elements can be formed as a rotor, puck, sledge, shuttle or the like, which can be moved according to the disclosure through magnetic interaction with at least one long stator of a linear motor, i.e. a linear motor thread, of the transport track along the transport track. Each transport element can thereby be accelerated or slowed down, moved with a constant velocity or also be stopped completely for a certain time on the transport track as needed. Through individual control of the transport elements, a variable path-time profile of each transport element can therefore be realized.

According to the disclosure, the transport track of the transport system has at least one (e.g., two) long stators of a linear motor. In this context, the transport track can in principle have any form. The transport track can essentially be closed, wherein closed essentially means that the transport track enables at least one closed path for the transport elements. In addition, the transport track can have any number of ramifications through the insertion of one or multiple switches.

Furthermore, the transport track can have at least one guiding rail on which the transport elements are supported movably by means of one or multiple bearing elements. The transport track can have two guiding rails in form of a double-rail system that are guided in parallel, for example as in case of railway tracks. The long stator(s) can in this context be arranged in parallel to the respective guiding rails or, for example in a centered way, between said guiding rails. A plurality of embodiments of the guiding rails and long stators is known in the state of the art.

The form and the cross-section of the guiding rails are thereby at random and only determined by the design of the transport elements as well as the bearing elements of the transport elements by means of which the transport elements are supported movably on the guiding rails. For example, each guiding rail can have a guiding channel in which a guiding pin of the transport elements is guided and/or a wheel flange on which one or multiple appropriately disposed guiding rollers of the transport elements roll. A plurality of alternative embodiments, e.g. by means of a slide bearing, is conceivable here. By means of providing guiding rails on the transport track, a low-friction movement of the transport elements along the transport track can be enabled. Besides, the transport track can have a running surface on which appropriate support elements, for example support rollers, can roll and/or slide.

The at least one long stator can be formed as a synchronous linear motor. In an alternative embodiment, the long stator can also be formed as an asynchronous linear motor, wherein at least one permanent magnet and/or non-switching electromagnet of a secondary part of the transport elements and/or an electrically conductive element of the transport elements, e.g. in form of a metallic plate on which the permanent magnet and/or non-switching electromagnet are supported, work as electric conductors for the induction by the asynchronous linear motors. For the magnetic interaction with the at least one long stator, the transport elements can, as mentioned, have respectively one secondary part that is equipped with at least one permanent magnet and/or at least one electromagnet, wherein the secondary part is formed in such a way that the respective transport element can be moved along the transport track through magnetic interaction with the at least one long stator of the transport track.

In some embodiments, the at least one long stator of the linear motor can be formed by a plurality of electric windings in form of electromagnets that can be controlled individually or in blocks and that are disposed along the linear motor thread. Also more complex embodiments, for example by means of a Halbach array of the electromagnets for reinforcing the magnetic flow on the side that faces the secondary part are conceivable in this context. The transport element can be formed as a passive transport element that is moved via a secondary part with at least one permanent magnet and/or non-switching electromagnet through interaction with the alternating electromagnetic fields that are created by the electromagnets of the linear motor that can be controlled individually. A non-switching electromagnet is thereby connected to a power supply and/or a regulating unit of the transport system in such a way that an electric current (e.g., which can be controlled) always flows through it in the same direction. Alternatively, the transport element as an active transport element can be equipped with electric windings that can apply the alternating magnetic fields that are required for the drive. Accordingly, the at least one long stator of the transport track is equipped with permanent magnets and/or non-switching electromagnets in this further development.

In one embodiment, the at least one permanent magnet and/or non-switching electromagnet can be arranged on the secondary part of the transport element in a way as to be oriented transversally to the transport track so that one of the magnetic poles of the permanent magnet and/or non-switching electromagnet can interact with a first long stator while the other magnetic pole can interact with a second long stator. Alternatively, however, the sides of the secondary part that face the first long stator and the second long stator can also have separate permanent magnets and/or non-switching electromagnets that can be formed in a Halbach array for reinforcement of the magnetic flow in the direction of the respective linear motor thread. In addition, also an embodiment with only one long stator is conceivable, wherein the magnets of the secondary part can be arranged in a Halbach array. A supply of the at least one non-switching electromagnet of the secondary part of the transport element with the required electric energy can be achieved via an electric line or power supply rail that is arranged along the transport track or via electric contacts of the transport element, e.g. via power collecting shoes. Alternatively, a transmission of the required electric energy via induction is also conceivable.

The transport elements can be guided along the transport track by means of a control and/or regulating unit, e.g. in form of a process computer. The control and/or regulating unit can thereby be implemented as a central control and/or regulating unit of the transport system and/or also by means of control and/or regulating units that are arranged on the transport elements in a decentralized way. Furthermore, the one or multiple control and/or regulating units can be formed as memory-programmable control unit(s). Through systematic control of individual electromagnets and/or individual blocks of electromagnets of the at least one long stator in a limited area of the transport track, a specific transport element can be accelerated systematically and therefore moved so that the transport element can be guided along the transport track individually and independently of other transport elements of the plurality of transport elements of the transport system. In this process, the control of the electromagnets of the long stator occurs by means of the control and/or regulating unit of the transport system. The voltage through the electric windings of the electromagnets of the long stator can be regulated individually by the control and/or regulating unit and automatically as a function of a force requirement of the transport element to be moved. Through individual controlling and/or regulating of the voltage through individual windings of the linear motor threads, the transport element can be accelerated, slowed down or moved with a constant predetermined velocity.

Depending on the formation of the guiding rail, the secondary part and/or of the at least one long stator, the transport elements can be supported on the transport track in a completely mechanical or partially magnetic and partially mechanical way. In case of a partially magnetic installation, the transport track is formed in such a way that the magnetic interaction between the secondary part of the transport element and the long stator leads to a partially magnetic levitation of the transport element and hence to a reduction of the mechanical stress of the bearing elements. In addition, the transport elements in this context have one or multiple support elements, e.g. in form of support rollers and/or guiding rollers that roll on the at least one guiding rail. Likewise, a partially or completely mechanical installation by means of at least one slide bearing is conceivable. An embodiment of the installation of the transport elements by means of slide bearings that are in contact with the guiding rail is cost-efficient. Additional support elements and/or slide bearings can thereby roll and/or slide on an additional running surface of the transport track. In case of a completely mechanical installation, the transport element can be supported exclusively by means of the described support elements and/or slide bearings.

For individual control of the transport elements along the transport track, the positions of the transport element on one section of the transport track can be determined through regular and periodic arrangement of sensors along at least said section of the transport track. In this context, the sensors can be formed as an optical sensor, electric sensor, electromagnetic sensor or mechanical sensor, wherein the position of the transport elements in the area of the sensor can be determined for example through measuring of a light reflection on a reflector element of the transport elements, through induction of an electromagnetic signal due to the movement of the transport elements, through changes of the electric resistance of the sensor by taking advantage of a magneto-resistive effect, e.g. due to the magnetic flow of a magnetic reference element (e.g., of a permanent magnet) or the secondary part of the transport elements, or through local pressure measurement due to the weight of the transport elements.

According to the disclosure, the front and back sides of the transport elements of the transport system are formed in such a way that the transport elements can be driven into one another at least in pairs and to the extent that a minimal transport spacing arises that is smaller than the longitudinal extension of the transport elements. The transport elements can be driven into one another to the extent that at least one roller of the leading transport element viewed in the running direction is located in the area of a roller of the trailing transport element or behind a roller of the trailing transport element. Here and in the following, the front side of a transport element shall be understood as the side of the transport element that is oriented in the movement direction. Accordingly, the back side shall be understood as the side of the transport element that faces away from the movement direction. Although the transport elements can generally be moved both in a forward as well as in a backward direction along the transport track by means of the abovementioned control unit, there will be a preferred transport direction due to the process sequence of the container treatment facility and due to the arrangement of the transport track so that the front and back sides of the transport elements arranged on the transport track are well defined. Depending on the embodiment, however, the transport elements can also be arranged on the transport track in a way as to be rotated by 180 degrees. In this case, the rollers of front and back side are inverted but without affecting the validity of the abovementioned relation of these two sides.

The minimal attainable transport spacing is defined by the distance of corresponding reference points of successive transport elements, for example of the centers of conveyed containers and/or transport elements, which can be achieved by guiding the successive transport elements at a closest possible distance to one another (e.g., in contact to one another). According to the present disclosure, said distance is smaller than the longitudinal extension of the transport elements due to an appropriate formation of the front and back sides of the transport elements. Here and in the following, the longitudinal extension of the transport elements shall be understood as the maximum extension of the transport elements in the transport direction. More precisely, the front and back sides of the transport elements are formed in such a way that the transport elements can be driven into one another at least in pairs. For example, the front and back sides of the transport elements can be formed in such a way that the front side of a trailing transport element and the back side of transport element that drives directly ahead can be driven into one another. This means that protruding parts of the front side of the trailing transport element can be driven into respective recesses of the back side of the leading transport element and/or that protruding parts of the back side of the leading transport element can be driven into respective recesses of the front side of the trailing transport element. The front and back sides of successive transport elements are therefore formed in such a fitting way that they can be driven into one another similar to an interlocking system. For example, the contour of the front side in a section of the trailing transport element that corresponds to the transport plane can fit into the contour of the back side in such a section of the leading transport element. The process of driving into one another thereby takes place according to the disclosure without deformation of the transport elements and can occur with mechanical contact of the transport elements.

In the simplest case, all transport elements are designed in such a way that this proportion of front and back side applies for the front and back side of each transport element itself. The transport elements are consequently not formed mirror-symmetrically with regard to one plane that is transversal to the transport direction. A more complex case arises when the proportion of front and back side relates exclusively to the front side of a trailing transport element and the back side of a leading transport element. In this case, pairs of transport elements could respectively be driven into one another to the extent that the minimal attainable transport spacing is smaller than their longitudinal extension. In some embodiments, successive transport elements are arranged in a way as to be rotated by 180 degrees towards one another, is described further below. In the similar formation of the transport elements mentioned first, however, entire trains and/or chains of transport elements can be formed with a minimal transport spacing.

According to a further development, the transport elements can each have bearing elements (e.g., rollers) that are spaced from one another in a longitudinal direction and by means of which the transport elements are supported movably on the transport track (e.g., on the abovementioned at least one guiding rail). The minimal attainable transport spacing is smaller than the minimal distance of these bearing elements in the longitudinal direction. For this purpose, the bearing elements can be disposed on appropriate protruding parts of the front and back sides of the transport elements. According to this further development, the bearing elements are arranged on the transport elements in such a way that the maximum distance of the bearing elements that encroach on the same guiding rail in the longitudinal direction, i.e. in the transport direction, but at least the maximum distance of two random bearing elements out of the totality of bearing elements of a transport element in the longitudinal direction is larger than the minimal attainable transport spacing. For example in a double-rail system, respectively one pair of guiding rollers, which are spaced from one another at a distance D in the longitudinal direction, can be provided per rail, wherein the distance D is larger than the minimal attainable transport spacing. The bearing elements (e.g., rollers) can be supported on the maximally protruding parts of the transport elements. In order not to hamper one another, the rollers of the front side can be disposed in a way as be tilted by 90 degrees in relation to the rollers of the back side. Alternatively, the rollers of the front side can encroach on the inner side of a guiding rail whereas the rollers of the back side encroach on an outer side of the guiding rail, or vice versa, wherein the inner and outer sides are defined in relation to the center line of a double-rail system.

By means of increasing the distance of the bearing elements, the transport elements can take on higher loads. For example, the transport elements are significantly more resistant against forces that act in a perpendicular direction to the transport direction as they can occur for example in case of a torque onto the transport element due to the container treatment. In case of a larger distance, the bearing elements have to withstand a lower stress. If the transport elements are held on the transport track by the magnetic interaction itself, the operating safety will be increased because the transport elements can be held on a guiding rail more safely. In case of a constant roller spacing, however, the transport elements according to the disclosure enable a smaller transport spacing and hence a higher throughput of containers per time unit. As the transport in container treatment facilities is often the limiting factor with regard to the throughput, the described further developments contribute to an increase of the competitiveness of linear transport systems in the beverage-processing industry.

In some embodiments, either the front side or the back side can have an essentially convex form and the back side and/or front side can have an essentially concave form accordingly. Essentially convex and essentially concave shall be understood in this context in a way that the outer parts that are supported on the side of the rails, in short the lateral parts, of the front and/or back side retract farther and/or protrude farther than all other parts of the front and/or back side. However, this does not mean that the front and/or back side have only one protrusion and/or only one recess.

Essentially convex and/or concave formations of the front and back side can be formed mirror-symmetrically in relation to a central plane of the transport elements that includes the transport direction and hence in a simple and side-stable way.

According to an alternative further development, the transport elements can be formed in a wedge-shaped or angular way, wherein successive transport elements are arranged on the transport track in a way as to be rotated by 180 degrees. This rotation of the transport elements hereby relates exclusively to the chassis, i.e. the installation and the secondary part, of the transport elements. Potential gripping devices or superstructures are of course aligned according to the requirements of the process track. For this purpose, it can be advantageous to provide for example different perforations or other recesses and/or fixing devices on a corresponding transport element in such a way that a uniform transport element ["Einheitstransportelement"] can be produced on which the respective required fixing devices can then be supported regardless of the orientation of the transport element. A wedge or angular shape thereby means that one longitudinal side of the transport elements has a larger extension than the other longitudinal side. This way, transport elements that are rotated towards one another by 180 degrees can be driven into one another to the extent that the minimal attainable transport spacing is smaller than the longitudinal extension of the longer longitudinal side. In this context, the transport elements are, as mentioned above, driven into one another in pairs.

According to another further development, the transport elements can each have rollers whose arrangement is inversion-symmetric in a plane of the chassis. The roller arrangement therefore has a $C_2$ symmetry. The chassis of these transport elements has for example a stair- or Z-shape that is stable against torques.

In addition, the transport elements can be supported on one or multiple guiding rails of the transport track by means of gothic rollers. Gothic rollers have gothic running grooves whose profile deviates from the circular arc shape. For this reason, gothic rollers always have two contact points with a guiding rail with a circular cross-section. An installation with gothic rollers therefore ensures low friction and wear.

As the contact points of the gothic rollers can move on the at least one guiding rail in a curve piece of the transport track on tracks with different curvature radii, also the gothic rollers of the transport elements can be formed in a way as to be divided into two halves along their symmetry plane that is perpendicular to their rotary axis, wherein the two halves are supported on the respective transport element in such a way that they can rotate independently of one another. Accordingly, each half can drive through the curve without slippage with a rotation that corresponds to the respective curvature radius so that the overall friction and the wear can be reduced.

Alternatively, also rollers with a convex, concave or cylindrical running surface can be used. The corresponding guiding rails can thereby have an appropriate concave, convex or even contact profile.

As mentioned above, the transport track can have at least one guiding rail. Accordingly, the transport elements can have bearing elements (e.g., rollers) that are respectively spaced from one another in the longitudinal direction and by means of which they are supported movably on the transport track, and a secondary part, wherein the secondary part is, as described above, formed in a way that the respective transport element can be moved through magnetic interaction with the at least one long stator of the transport track along the transport track. The one or multiple guiding rails can thereby be formed depending on the requirement for the guiding of the transport elements and the transport of the containers. For example, guiding rails, which have a cross-section profile with the form of a circle segment on which the abovementioned guiding rollers roll, are conceivable. For better stabilization of the passage, guiding rails can be provided on both sides of the transport elements and possibly even an upper and a lower rail pair. Depending on the form of the transport elements, however, a single guiding rail is possibly sufficient.

In the state of the art, the long stator(s) that drive the transport elements are arranged in parallel to the guiding rails and often connected mechanically to said guiding rails or to a carrier structure that carries the guiding rails. This is the case for both vertically arranged long stators, in which the air gap between the magnets of the secondary part of the transport elements and the magnets of the long stator is aligned vertically, as well as for horizontally arranged long stators in which the air gap between the magnets of the secondary part of the transport elements and the magnets of the long stator is aligned horizontally. The secondary part of the transport elements and the orientation of its permanent magnets and/or non-switching electromagnets is thereby adapted to the orientation of the long stator. The terms "vertical" and "horizontal" relate here and in the following to a contact surface of the transport system. In case of a parallel guiding of long stators and guiding rails, however, the relative position of the magnets of the secondary part and of the long stator changes during a curve ride of the transport elements because overlaps occur necessarily due to the limited spacing of the bearing elements of a transport element on the guiding rail, just as they are also known in railway construction for regular railway vehicles due to the length of wagons. In case of a vertical arrangement of the long stators, this leads to a change of the extension of the air gap while the overlap of the magnets of the secondary part and the long stator changes in case of a horizontal arrangement of the long stators. In both cases, the magnetic interaction is negatively influenced as also the normal and propulsion forces change due to the change of the width of the air gap and/or the overlap, which has to be compensated with a high workload through appropriate control of the magnets. This effect is stronger the longer the longitudinal distance of the bearing elements so that the effect becomes increasingly perceptible in case of the further developments of the transport elements described above.

The present disclosure solves this problem by deviating intentionally from the parallel guiding of guiding rail and long stator. The at least one guiding rail and the at least one long stator can be arranged in such a way that the course of the guiding rail and the course of the long stator deviate in sections from a parallel course. This way, the overlap that occurs necessarily can be compensated without a work-intensive electric control.

For example, the transport track can have at least one curve piece and at least one straight piece, wherein the relative course of the guiding rail and of the long stator in the area of the curve piece deviates from the relative course of the guiding rail and of the long stator in the area of the straight piece. The guiding rail and the long stator can be guided in parallel in the area of the straight piece, whereas their course in the area of the curve piece depends on the curvature radius of the curve piece, more precisely of the guiding rail. If the curvature radius is constant over the whole curve piece, the guiding rail and the long stator can be guided in parallel along the curve piece but with a different spacing from one another than along the straight piece.

The course of the guiding rail and of the long stator in the area of the curve piece can deviate from the course in the area of the straight piece as a function of a spacing of the bearing elements of the transport elements in the longitudinal direction and a curvature radius (e.g., a variable curvature radius) of the curve piece in such a way that the width of an air gap or the area of an overlap area between the long stator and the permanent magnet and/or electromagnet of the secondary part of the transport elements along the overall curve piece and the straight piece is as constant as possible. In this context, the first case relates, as mentioned above, to a vertical arrangement of the long stator while the second case relates to a horizontal arrangement of the long stator. The spacing of the bearing elements in the transport direction shall refer here and in the following to the maximum distance of the bearing elements supported on a guiding rail (e.g., of two guiding rollers) more precisely of their contact points with the guiding rail. Said distance defines the overlap during the curve ride in relation to the guiding rail. Hence, the course of the long stator according to this further development is adapted specifically for a formation of the transport elements. In this context, the (local) curvature radius of the guiding rail along the curve piece is taken into account in order to achieve a constant width of the air gap and/or a constant area of the overlap area, and hence a constant normal and propulsion force. The mentioned parameters define the course of the long stator in relation to the guiding rail unambiguously. Of course, this also applies when more than one guiding rail and more than one long stator are provided. The courses of the two guiding rails can thereby also deviate from the parallelism in case of a double-rail guiding if the longitudinal distances of the bearing elements are different on both sides, as it is the case for example in the abovementioned wedge-shaped or angular chassis.

In some embodiments, the transport track can have two guiding rails, which are guided in parallel and on which the transport elements are supported movably by means of the bearing elements, and two long stators of a two-sided linear motor, wherein the course of the long stator is oriented away from the respective guiding rail in the outer curve and wherein the course of the long stator is oriented towards to respective guiding rail in the inner curve. In other words, the distance of the long stator in the outer curve from the (local) central plane comprising the transport direction between the guiding rails that are guided in parallel is smaller than the distance of the long stator in the inner curve from this central plane. If we only look at the distances from said central plane, i.e. a projection onto a plane that is perpendicular to the central plane, the distance between the guiding rail and the long stator in the outer curve is larger than the distance between the guiding rail and the long stator in the inner curve of the curve piece. By adapting these distances, the widths of the air gaps between the long stators and the secondary part of the transport elements that is guided between the two long stators also remain constant during the curve ride.

Accordingly, a displacement of the long stator towards the inner curve, i.e. towards the guiding rail that is located on the side of the inner curve, can ensure in case of a horizontal arrangement of the long stator that the overlap area between the long stator and the magnets of the secondary part remains constant. Therefore, a constant normal and propulsion force can be guaranteed during the entire curve ride.

In some areas of the transport system, stronger propulsion forces than in other areas could be necessary. This can for example be required due to the treatment condition of the transported containers along the process track of the container treatment facility. For example, empty containers can be transported to stationary filling valves of a filling device by means of the transport system at the start of the process track. As the empty containers (e.g., plastic bottles) are very light, the transport elements only have to apply a weak propulsion force for their transport Immediately after filling, the containers are much heavier so that also a considerably stronger propulsion force is required.

According to a further development, individual sections of the transport track can therefore be assigned to different load conditions of the transport elements that can for example arise from the different treatment conditions of the containers to be transported, wherein the relative course of the long stator to the guiding rail varies as a function of the respective load condition of the transport elements along the transport track. In other words, the distance between the guiding rail and the long stator can vary as a function of the respective load condition. This distance can vary in such a way that the respective desired propulsion force can be achieved while supplying the electric windings of the long stator with a constant electric power.

In some embodiments, the relative course of the long stator to the guiding rail can vary in such a way that the distance between the secondary part and the long stator is smaller in areas with higher load conditions than the distance between the secondary part and the long stator in sections with lower load conditions. This can apply both for vertically as well as for horizontally arranged long stators. In case of vertically arranged long stators (e.g., in case of a two-sided linear motor) the distance in the abovementioned projection between the respective guiding rail and the long stator can be larger in sections with higher load conditions than in sections of lower load conditions. In this context, it is irrelevant whether the piece of the transport track is curved or straight. In addition, the above descriptions are of course also applicable accordingly for transport systems with multiple guiding rails. The variation of the relative course as a function of the respective load condition ensures that the optimal propulsion forces are always available along the complete driving track.

Further features and exemplary embodiments as well as advantages of the present disclosure will be described in greater detail by means of the drawings in the following. It is clear that the embodiments do not exhaust the field of the present disclosure. It is further clear that some or all of the features described in the following can also be combined with one another in a different way.

In the Figures described in the following, identical reference signs may denominate identical elements. For the sake of better clarity, identical elements will only be described when they arise for the first time. However, it is clear that the variants and embodiments of an element described with reference to one of the Figures can also be applied to the corresponding elements in the remaining Figures.

FIG. 1 shows a three-dimensional view of a linear transport system as it is known in the state of the art and as it was described for example in the DE 10 2013 218 389 A1. The shown linear transport system 100 includes a transport track that has a first guiding rail 140-1, a second guiding rail 140-2, a first long stator 150-1 and a second long stator 150-2. Hence, the shown transport system is formed as a double-rail system with a two-sided linear motor.

Between the two guiding rails, the transport elements 110 are moved systematically through magnetic interaction with the long stators 150-1 and 150-2. The shown transport element 110 thereby transports one or multiple containers 130, which are shown exemplarily as a plastic bottle in this context, by means of a gripping element 120, for example a neck handling bracket that encroaches in the area of the neck ring. In the displayed embodiment, the plastic bottle is disposed underneath the transport element 110 in a suspended way. However, it is clear that the transported container can also be transported in a standing or lying position on the transport element 110, where required by means of an appropriate holding device.

Figure 2:
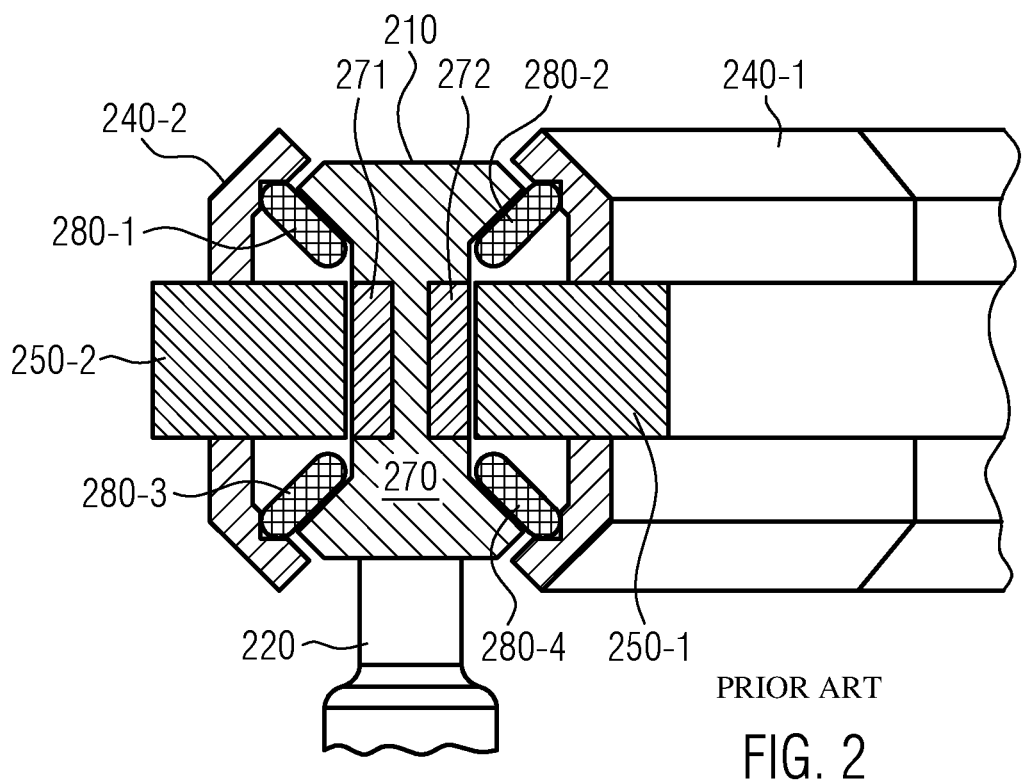
FIG. 2 illustrates a cross-section of the transport system shown in FIG. 1.

FIG. 2 shows a cross-section through an exemplarily displayed transport element as it is known in the state of the art. The shown transport element 210 is moved in a controlled way between two guiding rails 240-1 and 240-2, which are arranged in parallel to one another, via magnetic interaction with the long stators 250-1 and 250-2 that are fastened on the guiding rails and that extend in parallel to said guiding rails, wherein guiding rollers 280-1 through 280-4 are in contact with guiding grooves, which are disposed on the guiding rails 240-1 and 240-2 precisely for this purpose, as bearing elements of the transport element. Alternatively, also wheel flanges or guiding channels can be used.

Besides the gripping element 220 of the container to be transported, the transport element 210 displayed herein has a secondary part 270 that is used for propulsion of the transport element along the transport track through interaction with the linear motor threads 250-1 and 250-2. For this purpose, the secondary part has one or multiple permanent magnets and/or non-switching electromagnets of which only two magnetic poles 271 and 272 are displayed here in an exemplary way. In the exemplary embodiment displayed herein, the secondary part includes permanent magnets that are disposed on a carrier plate and separately from one another on both sides. A plurality of alternative embodiments is conceivable and known in the state of the art. It is clear that the form and design of the secondary part of the transport elements described in the following can be adapted to the form of said transport elements.

Figure 3:
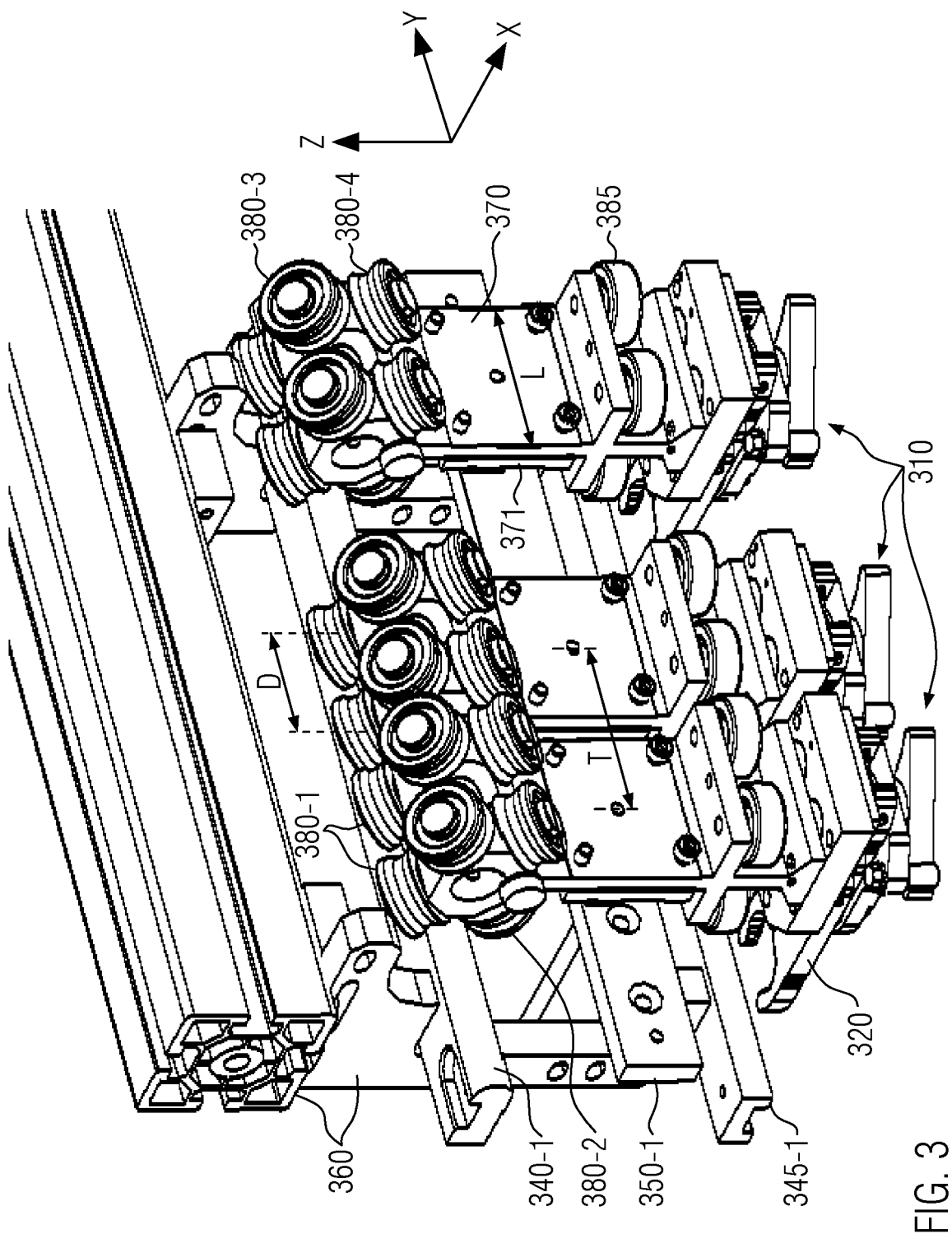
FIG. 3 illustrates the form and structure of transport elements of a linear transport system that are known in the state of the art.

FIG. 3 shows the form and structure of exemplary transport elements of a linear transport system that are known in the state of the art. For the sake of simplicity, only one side of the linear motor is displayed in FIG. 3. However, it is clear that corresponding elements such as guiding rails and long stator can also be arranged on the side that is not displayed. In the three-dimensional view displayed herein, a plurality of similarly formed transport elements 310 is arranged on a guiding rail 340-1 by means of rollers 380-1 and 380-2 as bearing elements. The guiding rail 340-1 is held by a carrier structure 360 in form of a carrier frame. Besides the guiding rail 340-1, which has a semicircular profile on which the rollers 380-1 and 380-2 roll, the carrier structure 360 carries a long stator 350-1 and a running rail 345-1 on which additional support rollers 385 of the transport elements move. For the sake of simplicity, the long stator 350-1 is displayed without electric windings in FIG. 3. To drive the transport elements, said windings interact with the permanent magnets and/or non-switching electromagnets 371 that are fastened on the secondary part 370 of the transport elements 310. Furthermore, the displayed transport elements 310 have guiding rails 380-3 and 380-4 that roll on a second guiding rail that is not displayed. In addition, each transport element 310 has a gripping element 320 for form- or force-fitting holding of the containers to be transported. Said gripping element can hold the containers to be transported passively, e.g. by means of a bracket that is pre-tensioned by a spring, or actively by means of a switchable bracket.

As shown in FIG. 3, the transport elements known in the state of the art have an essentially rectangular profile in the center plane between the long stators, i.e. in the yz-plane. Said profile determines on one hand the longitudinal extension L of the transport elements, i.e. their maximum extension in the transport direction, as well as the minimal attainable spacing T, i.e. the minimum distance of corresponding points of successive transport elements in the transport direction up to which the transport elements can be driven towards one another, without hampering one another for example due to protrusions of the guiding rails 380-1 to 380-4. Due to the rectangular profile of the transport element, this transport spacing T cannot be smaller than the longitudinal extension L of the transport elements. As shown in FIG. 3, corresponding points of the transport elements can be used to determine the distance in the transport direction. For example, the centers of gravity of the transport elements 310 can be used for this purpose.

The transport elements shown in FIG. 3 are each supported on the respective guiding rail 340-1 via two guiding rails, for example 380-1, that are located at a close distance to one another in order to enable a compact formation of the transport element and hence a high container throughput. The distance D of these guiding rollers is for example defined, as shown, by the distance of the bearings of the rollers and is an essential factor for determining the stability of the guiding in relation to a torque around the x-axis as it can occur during treatment of the transported containers. As this distance D is low due to the compact formation of the transport elements, there is no sufficient stability on one hand and there will be an unfavorable proportion of resistance and wear of the bearing elements as mentioned above on the other hand. In particular, the distance D is always significantly smaller than the minimal attainable transport spacing T in case of the transport elements 310 known in the state of the art.

Figure 4:
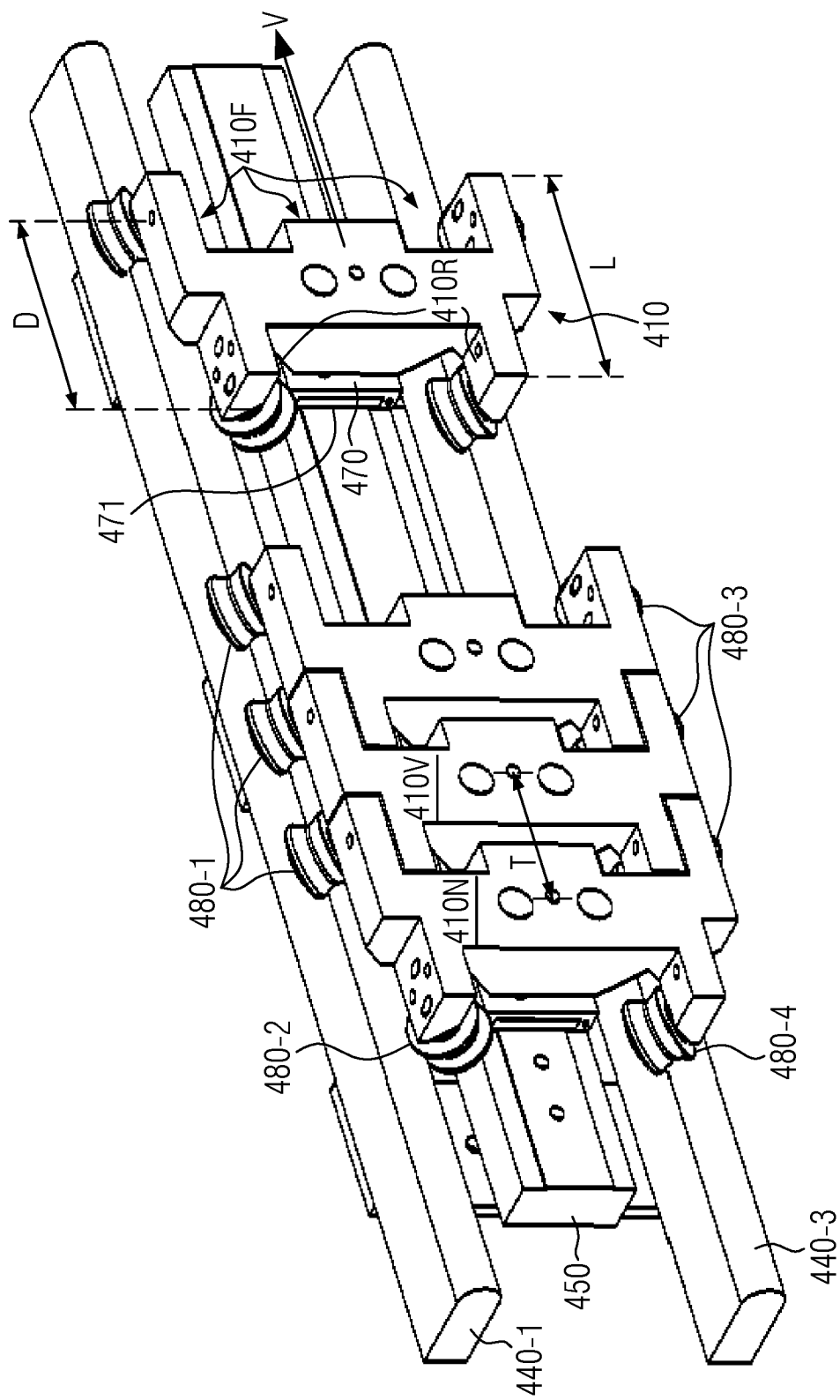
FIG. 4 illustrates a linear transport system, according to certain embodiments.

FIG. 4 shows a first exemplary embodiment of a linear transport system according to the present disclosure. In the shown non-limiting further development, the transport elements 410 are supported on two guiding rails 440-1 and 440-3 that are guided in parallel by means of guiding rollers 480-1 to 480-4, wherein a long stator 450 is disposed between the guiding rails. The exemplary illustration shows a one-sided linear motor in which the transport elements 410 are held laterally on the guiding rails by the vertically aligned long stator 450 through magnetic interaction with the magnets 471 of the secondary part 470 of the transport elements 410. However, it is clear that the present disclosure is not limited to this arrangement. Of course, the transport elements 410 can also be guided in a two-sided way and also be driven in a two-sided way. Likewise, the shown configuration can be rotated into a horizontal plane so that the transport elements 410 can be moved like wagons on the double-rail system 440-1 and 440-3.

In the present disclosure, the front sides 410F and back sides 410R of the transport elements 410 are formed in such a way that the transport elements can be driven into one another to the extent that a minimal transport spacing T arises that is smaller than the longitudinal extension L of the transport elements. The front and back side 410F and/or 410R of a transport element 410 are defined in this context based on the preferred transport direction v that is derived from the arrangement of the transport system in the container treatment facility. The descriptions in this disclosure that relate to the front and back side, however, can also be transferred to transport elements rotated by 180 degrees without restriction.

As can be seen in FIG. 4, the transport elements 410 can be driven into one another to the extent that the rollers 480-2 and 480-4 of the leading transport element are behind the rollers 480-1 and 480-3 of the trailing transport element when viewed in the transport direction v.

The profile and/or the contour of the transport element 410 reduced to the chassis for the sake of clarity in a plane, which contains the movement vector v and which is parallel to the plane that is spread out by the guiding rails 440-1 and 440-3, is now no longer essentially rectangular but rather characterized by protrusions and recesses that can be driven into one another as shown in FIG. 4. In this process, a trailing transport element 410N can be driven towards a leading transport element 410V to the extent that the minimal attainable transport spacing T is smaller than the maximum longitudinal extension L of the transport elements and even becomes smaller than the distance D of the guiding rollers 480-1 and 480-2. In the further development shown herein, the distance D emerges as the maximum distance of two random bearing elements in the transport direction v. The possible overlap of the front and back sides of the chassis of the transport elements enables a reduced transport spacing T and at the same time an increase of the distance D of the bearing elements. Therefore, both the container throughput as well as the stability of the guiding can be increased while the wear of the bearing elements can be reduced. For example, for transport elements with a longitudinal extension from 90 to 110 millimeters (mm), a minimal transport spacing of 40 to 60 mm can be achieved. In some embodiments, the transport elements can be formed in a way that the minimal attainable transport spacing T is smaller than 85% of the longitudinal extension L of the transport elements. In some embodiments, the transport elements can be formed in a way that the minimal attainable transport spacing T is smaller than 55% of the longitudinal extension L of the transport elements. In some embodiments, the transport elements can be formed in a way that the minimal attainable transport spacing T is smaller than 40% of the longitudinal extension L of the transport elements.

Figure 5:
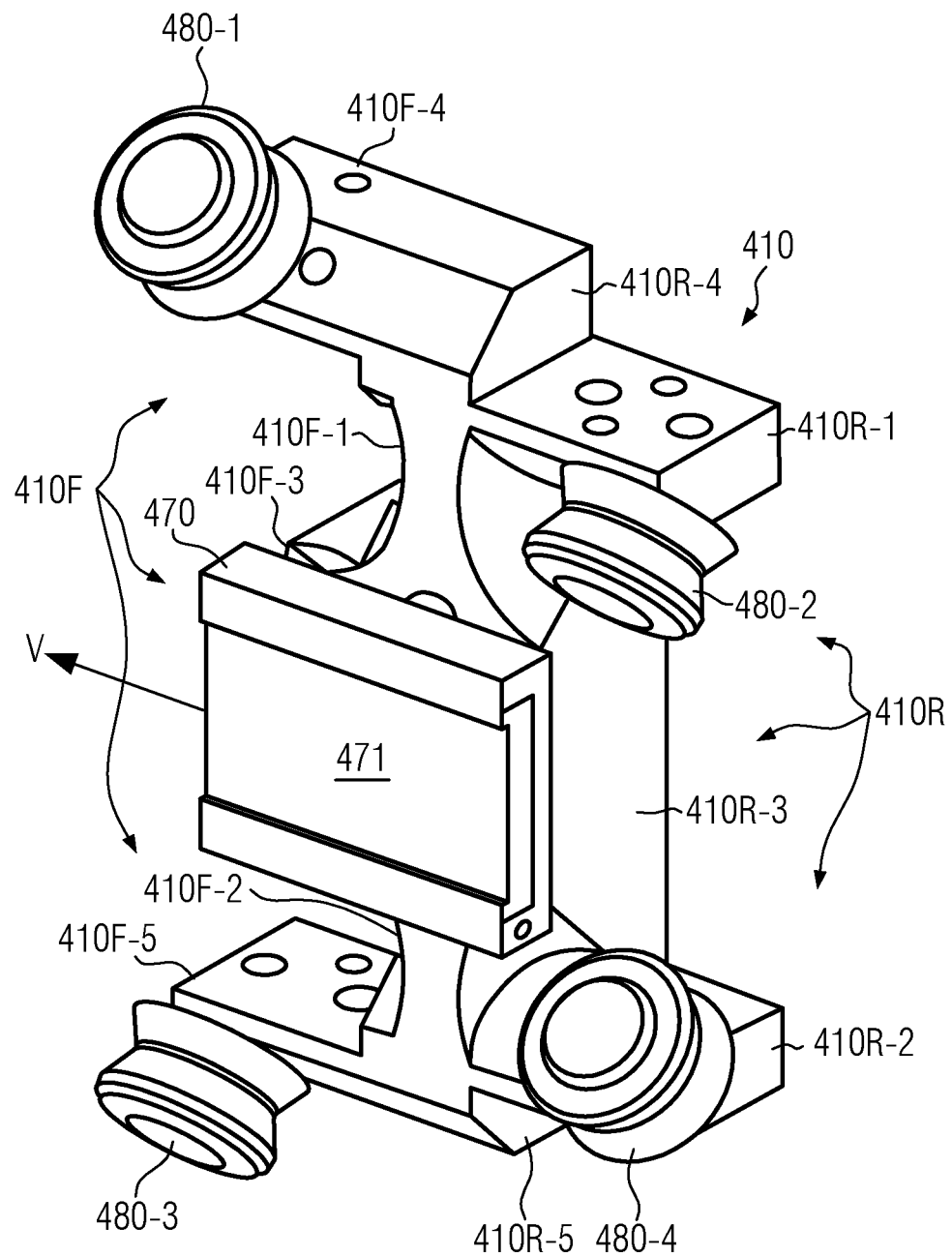
FIG. 5 illustrates a detailed drawing of the chassis of a transport element, according to certain embodiments.

The mentioned possible interlocking of front side 410F and back side 410R of a transport element can be understood better on the basis of the detailed drawing of a transport element according to the present disclosure in FIG. 5. Besides the recesses 410E-1 and 410E-2, the front side 410F has several protrusions 410E-3 to 410E-5. Accordingly, the back side 410R has appropriately designed protrusions 410R-1 and 410R-2 and recesses 410R-3 to 410R-5. The recesses and protrusions are thereby formed in such a way that the protrusions 410E-3 to 410E-5 of the front side 410F can be driven into the recesses 410R-3 to 410R-5 of the back side 410R and vice versa the protrusions 410R-1 and 410R-2 of the back side 410R can be driven into the recesses 410E-1 and 410E-2 of the front side 410F. In this context, the guiding rollers 480-1 and 480-3 and/or 480-2 and 480-4 are arranged on the protrusions 410E-4 and 410E-5 as well as 410R-1 and 410R-2 in order to achieve a distance D as large as possible to the bearing elements. In order not to hamper one another while the transport elements 410 are driving into one another, the guiding rollers 480-1 and 480-3 of the front side 410F can in addition be tilted by 90 degrees in relation to the guiding rollers 480-2 and 480-4 of the back side 410R as it is shown in FIG. 5. The relative position of the rollers to the plane between the guiding rails 440-1 and 440-3 can thereby of course deviate from the 45 degrees position that is exemplary in this context. In addition, the tilted position allows in a simple way that respectively two guiding rollers 480-1 and 480-2 and/or 480-3 and 480-4 can be guided on the same guiding rail, which simplifies the overall structure.

Figure 6:
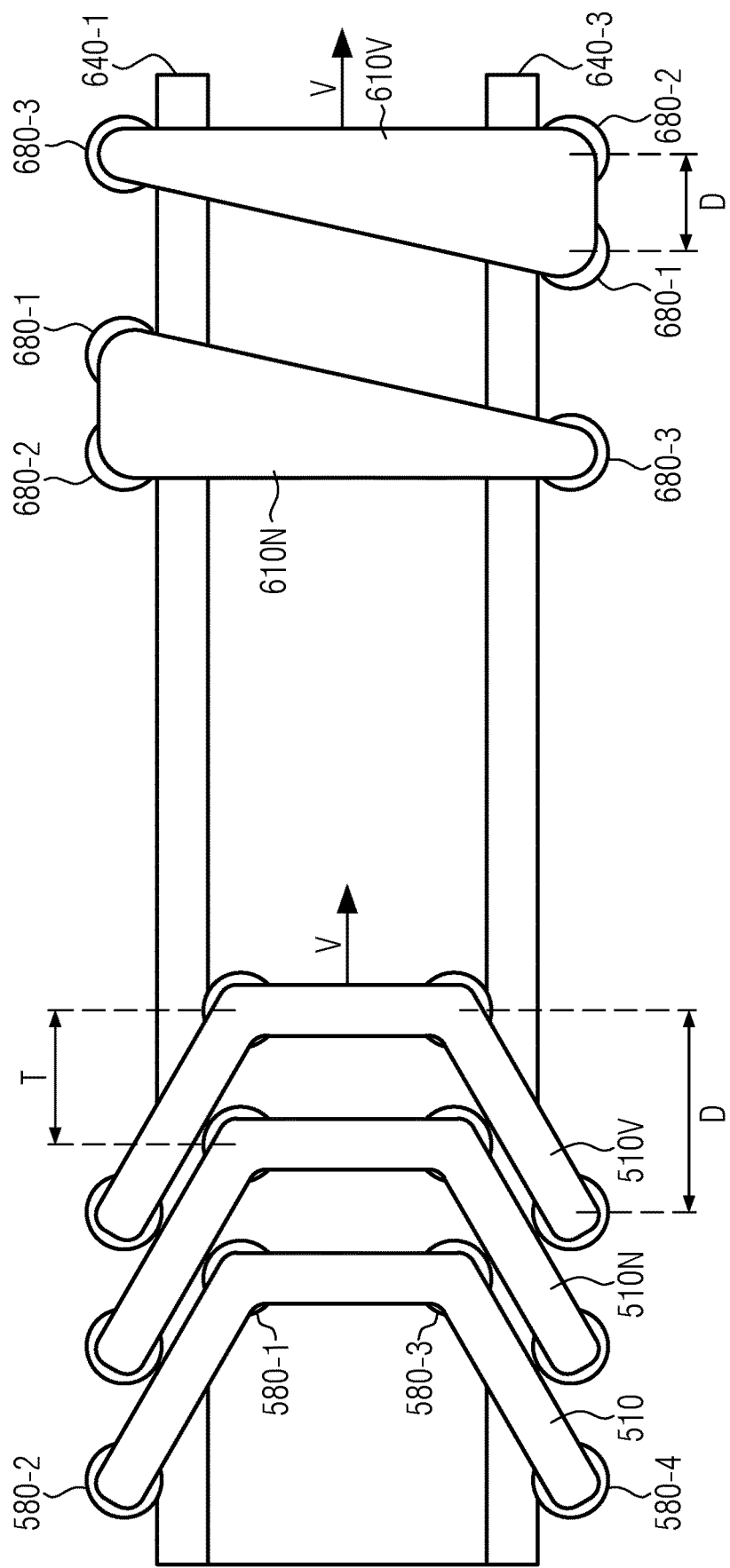
FIG. 6 illustrates two alternative further developments of the chassis of a transport element, according to certain embodiments.

Two alternative embodiments of the transport elements according to the present disclosure are displayed schematically in FIG. 6. Also here, the illustration is limited for the sake of simplicity to the chassis of the transport elements. It is clear that further required elements such as secondary part, gripping elements and the like can be arranged at an appropriate place on the transport elements. On the left, transport elements 510, whose front side and/or back side has an essentially convex and/or concave form, are shown. The displayed transport elements 510 are supported on a first guiding rail 640-1 by means of guiding rollers 580-1 and 580-2 that encroach on both sides, and on a second guiding rail 640-3 by means of guiding rollers 580-3 and 580-4 that encroach on both sides. Due to the U-shaped design of the chassis, a trailing transport element 510N can be driven into a leading transport element 510V to the extent that the minimal attainable transport spacing T is significantly smaller than the distance D of the bearing elements in the transport direction v. For example, a minimal spacing T of 40 mm can be achieved for a distance D of 60 mm.

A slightly different further development of the transport elements is displayed on the right side of FIG. 6. Here, the chassis of the transport elements are formed in an angular way, wherein successive transport elements 610N and 610V are arranged on the guiding rails 640-1 and 640-3 in a way as to be rotated by 180 degrees. Hence, the trailing transport element 610N is supported exemplarily with two rollers 680-1 and 680-2 on the first guiding rail 640-1 and with only one roller 680-3 on the second guiding rail 640-3 while the leading transport element 610V is supported on the second guiding rail 640-3 with two rollers 680-1 and 680-2 and on the first guiding rail 640-1 with only one roller 680-3. The distance D of the bearing elements is hereby defined as the maximal distance of two rollers. Due to the wedge-shaped structure of the transport element above the rollers 680-1 to 680-3 that are arranged in an angular way, a transport spacing T, which is smaller than the longitudinal extension of the transport elements, can be achieved. In this context, the transport elements are always driven into one another in pairs according to this further development.

Figure 7:
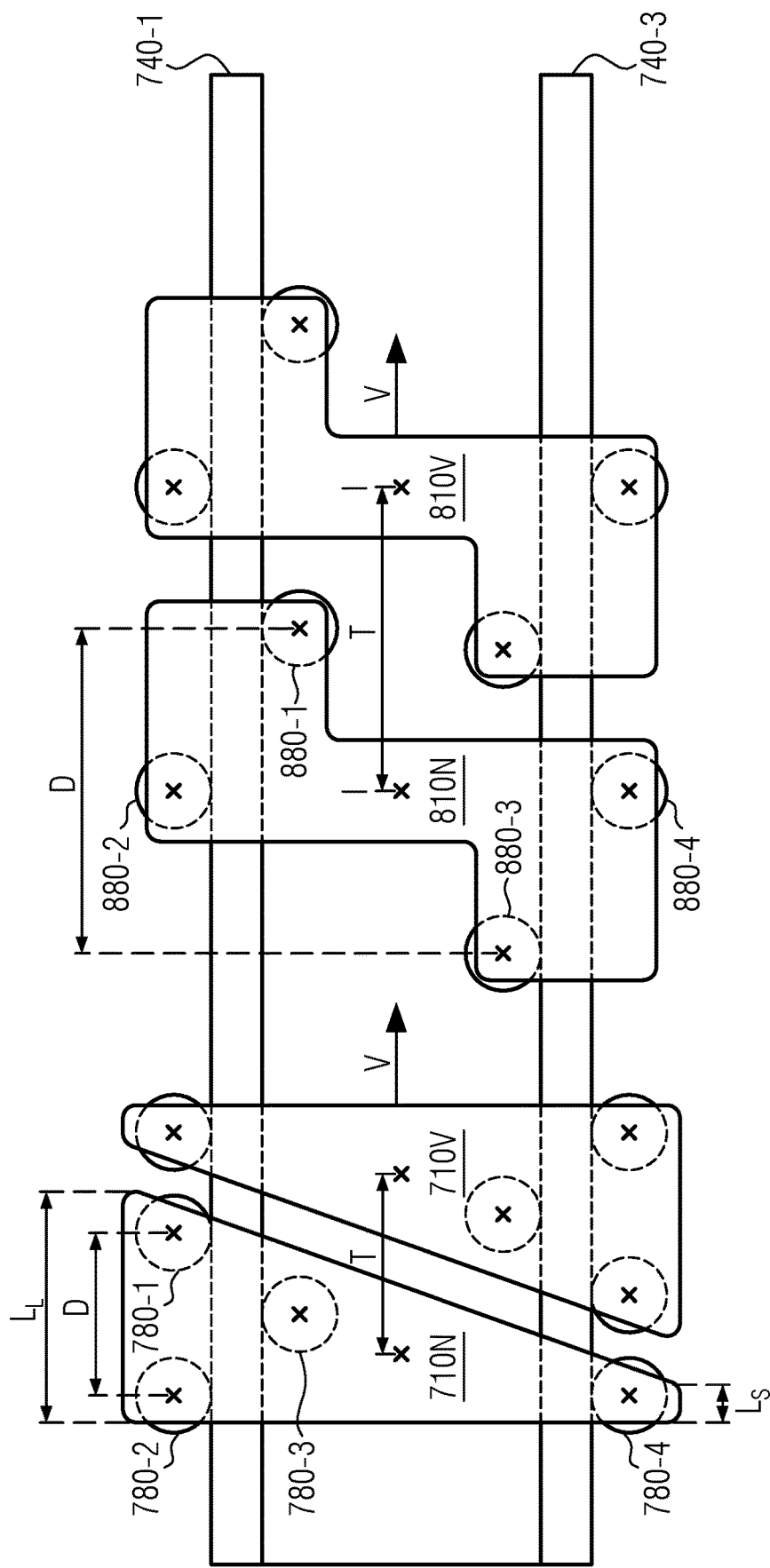
FIG. 7 illustrates two other alternative further developments of the chassis of a transport element, according to certain embodiments.

A similar further development with a wedge-shaped chassis is schematically displayed in the left part of FIG. 7. Here, the transport elements are supported for the purpose of stabilization against torques on the first guiding rail 740-1 with three guiding rollers 780-1 to 780-3 whereas they are supported on the second guiding rail 740-3 with only one guiding roller 780-4. The transport elements therefore have a long longitudinal side with the extension $L_L$ and a short longitudinal side with the extension $L_S$. The distance D of the bearing elements arises as the distance of the rollers 780-1 and 780-2 because this is the largest distance in the longitudinal direction. The transport spacing T between corresponding points of the trailing transport element 710N and the leading transport element 710V is visibly smaller than the extension $L_L$ of the long side. In addition, the spacing between two successive pairs of transport elements that are rotated by 180 degrees is also smaller than their longitudinal extension so that there will be a transport flow with a high throughput.

On the right side of FIG. 7, a further development is finally displayed in which the transport elements have a stair- and/or Z-shaped chassis. At least in relation to the arrangement of the guiding rollers 880-1 to 880-4, said chassis is formed inversion-symmetrically in relation to an inversion point I so that the chassis has a $C_2$ symmetry. In this case, the maximum distance D of the bearing elements arises in this case for the guiding rollers 880-1 and 880-3 that are disposed on different guiding rails 740-1 and 740-3, which is also in this case larger than the minimal attainable spacing T between the trailing transport element 810N and the leading transport element 810V. The arrangement of the guiding rollers provides this chassis with a high stability against torques.

A plurality of further embodiments whose minimal transport spacing is smaller than the longitudinal extension of the transport elements is conceivable as part of the present disclosure. In this context, the further developments that are illustrated and described explicitly can be adapted according to the requirements of the process track without infringing the described fundamental principle.

FIG. 8 shows an embodiment of guiding roller according to the present disclosure that is suitable for curve rides on circular guiding rails. Gothic guiding rollers with a gothic roller profile 980S are well known in the state of the art. While such a roller rolls on a circular segment-shaped guiding rail 940, the roller is in mechanical contact with the guiding rail 940 via two contact points 940A and 940B. This leads to a rolling behavior with a low friction. However, if the guiding rail 940 forms a curve, the contact points 940A and 940B can be located on curves with different curvature radii, which would lead to an increased friction. The gothic roller 980 according to the present disclosure solves this problem by being formed in a way as to be divided into two halves 981 and 982, which can rotate independently of one another, i.e. with different rotation velocities, due to their separate installation on the axis 983, along its central plane that is perpendicular to the rotation axis. This way, slippage and unnecessary friction can be avoided and the roller wear can be reduced.

FIG. 9A shows a curve piece of a transport track with a one-sided long stator arrangement as it is known in the state of the art. In the displayed configuration, the guiding rollers 1080-1 and 1080-2 of the transport elements roll on a guiding rail 1040 that is illustrated as a dashed/dotted line while the secondary parts 1070 of the transport elements are taken along between the guiding rail 1040 and the long stator 1050A that is arranged on one side. As the structure consisting of guiding rollers 1080-1 and 1080-2 as well as the secondary part 1070 is generally rigid as indicated by the dashed line, there are inevitable overlaps in the area of the curve piece as they are also known from wagons in railway traffic or buses. Therefore, the secondary part 1070 in the area of the curve is guided more closely towards the guiding rail 1040 than in the area of the straight piece so that the air gap between the magnets of the secondary part 1070 and of the long stator 1050A increases on the other hand. However, this leads to the propulsion force, which is applied by the long stator 1050A onto the transport element, being lower in the area of the curve piece than in the area of the straight piece so that a work-intensive compensation by means of an appropriate sectional control of the voltage in the electric windings of the long stator is required. This effect is even reinforced by the increased distance D of the bearing elements of the transport elements described above according to the present disclosure.

The present disclosure solves this problem by means of deviating from the strict parallel guiding of the long stator 1050A and the guiding rail 1040 as shown in FIG. 9B. The original parallel course of the long stator 1050A is illustrated as a dashed line in FIG. 9B while the course of the long stator 1050B according to the disclosure is shown as a continuous line. As can be seen from the relative position of these lines, the long stator 1050B extends in parallel to the guiding rail 1040 in the area of the straight piece of the transport track but subsequently deviates from this parallel course in the direction of the guiding rail during the transition to the curve. In this context, this deviation can be chosen, as a function of the formation of the secondary part 1070, the distance of the rollers 1080-1 and 1080-2 and the (local) curvature radius, exactly in such a way that the width of the air gap between the long stator 1050B and the magnets of the secondary part 1070 remains constant over the entire track. Therefore, a constant propulsion force can also be guaranteed during the curve ride. Here, the course of the long stator 1050A and/or the course of the guiding rail 1040 can be modified in such a way that the abovementioned effects are achieved. In some embodiments, only the course of the guiding rail 1040 can be modified accordingly. This is advantageous because standardized modules of long stators can be used this way and only the guiding that is easier to modify has to be adjusted.

Figure 10:
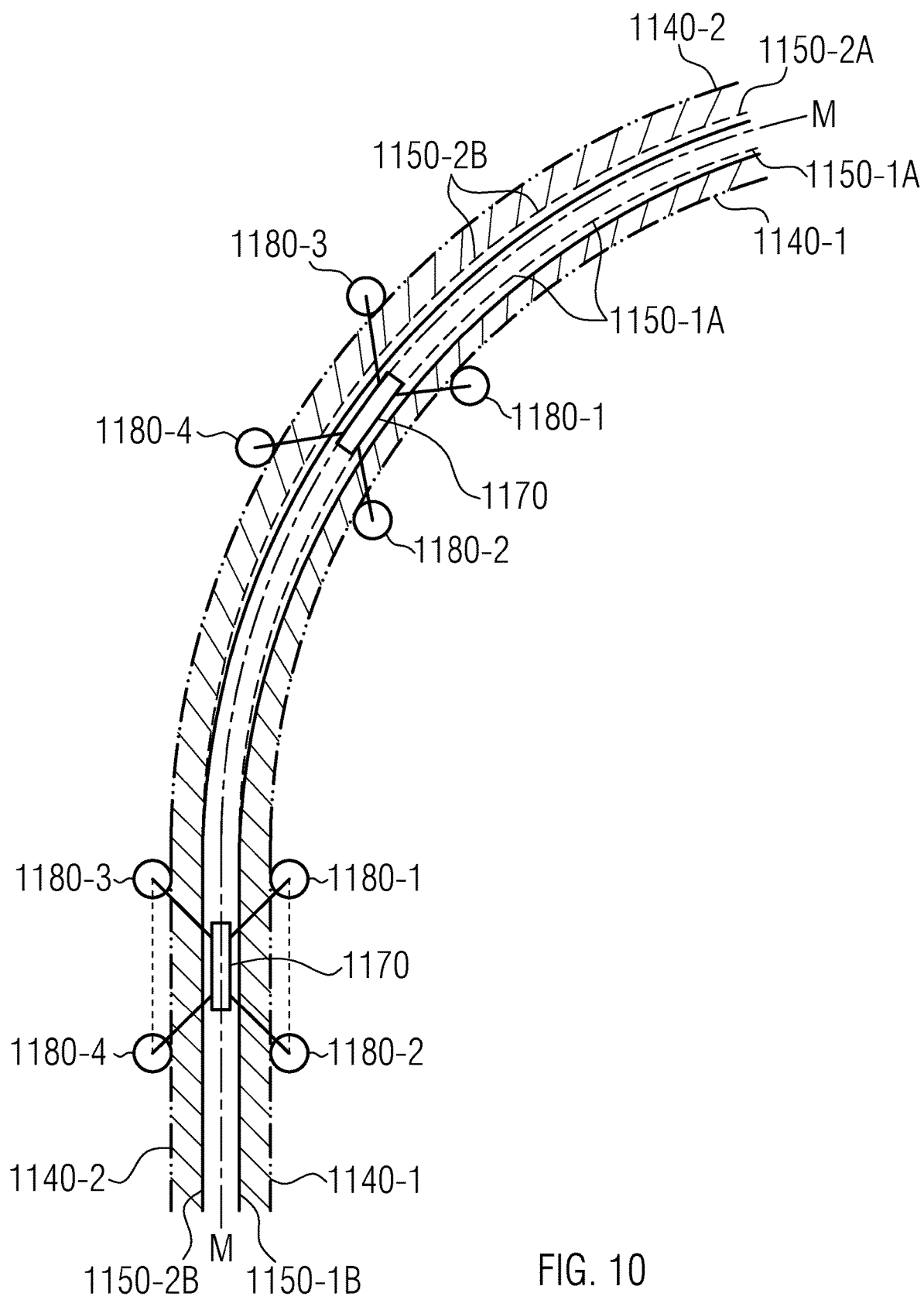
FIG. 10 illustrates an extension of the principle from FIG. 9B to a double-rail system with a two-sided linear motor, according to certain embodiments.

FIG. 10 eventually shows an extension of the principle from FIG. 9B to a double-rail system with a two-sided linear motor. For the sake of simplicity, this Figure shows transport elements with a symmetric arrangement of the guiding rollers 1180-1 to 1180-4 that roll on guiding rails 1140-1 and 1140-2 of a double-rail system that are guided in parallel. In the middle (e.g., exactly in the middle) between the guiding rollers 1180-1 to 1180-4, the secondary part 1170, on which magnets that interact with the electromagnets of the long stators 1150-1B and 1150-2B of a two-sided linear motor are disposed on both sides as shown in FIG. 2, is arranged. The parallel course 1150-1A and 1150-2A of these two long stators is also shown in FIG. 10, once again as a dashed line. In addition, the center line M that extends in parallel and exactly between the guiding rails 1140-1 and 1140-2 is shown.

As already described, the position of the secondary part 1170 shifts due to the overlaps through the limited distance of the guiding rollers 1180-1 and 1180-2 and/or 1180-3 and 1180-4 during the curve ride in the direction of the guiding rail that is located on the inner curve while it shifts away from the guiding rail 1140-2 that is located on the outer curve. In order to keep the widths of the air gaps between the respective long stator and the magnets of the secondary part 1170 constant even during the curve ride, the curve progression of the long stator 1150-1B therefore deviates from the parallel curve progression 1150-1A on the inner curve in the direction of the guiding rail 1140-1 whereas the curve progression of the long stator 1150-2B deviates from the parallel curve progression 1150-1A on the outer curve in the direction towards the center line M, i.e. away from the guiding rail 1140-2. Also here, the curve progression of the long stators 1150-1B and 1150-2B can be predetermined as a function of the formation of the transport elements and the (local) curvature radius of the curve piece in such a way that there will always be a constant propulsion force during constant power supply of the long stators. Therefore, a control of the linear motor can be simplified significantly on one hand and excessive wear of the guiding rollers and rails due to changing normal forces can be avoided on the other hand.

The described further developments allow for a substantial increase of the container throughput in linear transport systems and therefore enable an increased use of such systems in the beverage-processing industry. At the same time, the stability of the transport elements can be improved and the wear of the bearing elements can be reduced.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A transport system for transporting containers in a container treatment facility, the transport system comprising:
    a transport track with at least one long stator of a linear motor; and
    a plurality of transport elements to transport the containers,
        wherein the plurality of transport elements are disposed movably on the transport track and are configured to be guided individually and independently of one another along the transport track through magnetic interaction with the at least one long stator,
        wherein a front side of a trailing transport element of the plurality of transport elements is to be driven into a back side of a leading transport element of the plurality of transport elements,
        wherein a minimal attainable transport spacing between the leading transport element and the trailing transport element is smaller than a longitudinal extension of at least one of the trailing transport element or the leading transport element, and
        wherein the minimal attainable transport spacing between the leading transport element and the trailing transport element is defined by a distance of corresponding reference points of the leading transport element and the trailing transport element that can be achieved by guiding the leading transport element and the trailing transport element at a closest possible distance to one another.

2. The transport system of claim 1, wherein a corresponding front side and a corresponding back side of each of the plurality of transport elements is formed in such a way that the corresponding front side of any trailing transport element can be driven into the corresponding back side of any leading transport element.

3. The transport system of claim 1, wherein each transport element of the plurality of transport elements comprises bearing elements that are spaced from one another in a longitudinal direction, wherein the bearing elements cause the transport element to be mounted movably on the transport track, and wherein the minimal attainable transport spacing is smaller than distance of the bearing elements in the longitudinal direction.

4. The transport system of claim 3, wherein the bearing elements are rollers.

5. The transport system of claim 1, wherein:
    the front side has an essentially convex form and the back side has an essentially concave form; or
    the back side has the essentially convex form and the front side has the essentially concave form.

6. The transport system of claim 1, wherein the plurality of transport elements are formed in a wedge shape or an angular shape, and wherein successive transport elements are rotated by 180 degrees relative to each other.

7. The transport system of claim 1, wherein each transport element of the plurality of transport elements has rollers that cause the transport element to be supported on the transport track, and wherein arrangement of the rollers is inversion-symmetric.

8. The transport system of claim 1, wherein the transport track has at least one guiding rail on which the plurality of transport elements are mounted movably via gothic rollers.

9. The transport system of claim 8, wherein the gothic rollers of the plurality of transport elements are divided into two halves along a symmetry plane perpendicular to a corresponding rotary axis of each of the gothic rollers, and wherein the two halves are mounted such that the two halves can rotate independently of one another.

10. The transport system of claim 1, wherein each of the plurality of transport elements comprises a corresponding holding device to hold one or more of the containers.

11. The transport system of claim 10, wherein the corresponding holding device comprises a neck handling bracket for neck handling of bottles.

12. The transport system of claim 1, wherein:
    the transport track comprises at least one guiding rail;
    each of the plurality of transport elements comprises bearing elements spaced from one another in a longitudinal direction and by means of which the plurality of transport elements are mounted movably on the transport track;
    each of the plurality of transport elements comprises a secondary part comprising at least one of a permanent magnet or an electromagnet;
    each of the plurality of transport elements is to be moved along the transport track through the magnetic interaction with the at least one long stator of the transport track via the secondary part; and
    a first course of the at least one guiding rail and a second course of the at least one long stator deviate in sections from a parallel course.

13. The transport system of claim 12, wherein the transport track comprises a curved piece and a straight piece, and wherein the second course of the at least one long stator relative to the first course of the at least one guiding rail deviates in a first area of the curved piece from the second course of the at least one long stator relative to the first course of the at least one guiding rail in a second area of the straight piece.

14. The transport system of claim 13, wherein the second course of the at least one long stator relative to the first course of the at least one guiding rail in the first area of the curved piece deviates from the second course of the at least one long stator relative to the first course of the at least one guiding rail in the second area of the straight piece as a function of a spacing of the bearing elements of the plurality of transport elements in the longitudinal direction and a curvature radius of the curved piece, wherein an air gap or an overlap area between the at least one long stator and at least one of the permanent magnet or the electromagnet of the secondary part is constant along the curved piece and the straight piece.

15. The transport system of claim 14, wherein the curvature radius of the curved piece is a variable curvature radius.

16. The transport system of claim 13, wherein the transport track comprises a first guiding rail and a second guiding rail two guiding rails routed in parallel on which the plurality of transport elements are mounted movably via the bearing elements, wherein the at least one long stator of the linear motor comprises a first long stator and a second long stator, and wherein a first distance between the first guiding rail and the first long stator in an outer curve is larger than a second distance between the second guiding rail and the second long stator in an inner curve of the curved piece.

17. The transport system of claim 12, wherein individual sections of the transport track are associated with different load conditions of the plurality of transport elements, and wherein a relative course of the at least one long stator to the at least one guiding rail varies as a function of a respective load condition along the transport track.

18. The transport system of claim 17, wherein a first distance between the secondary part and the at least one long stator is smaller in first sections of higher load conditions than a second distance between the secondary part and the at least one long stator in second sections of lower load conditions.

19. A plurality of transport elements for transporting containers in a container treatment facility, the plurality of transport elements comprising:
　a leading transport element comprising a back side; and
　a trailing transport element comprising a front side configured to be driven into the back side of the leading transport element,
　　wherein the plurality of transport elements are disposed movably on a transport track and are to be guided individually and independently of one another along the transport track through magnetic interaction with at least one long stator of the transport track,
　　wherein a minimal attainable transport spacing between the leading transport element and the trailing transport element is smaller than a longitudinal extension of at least one of the leading transport element or the trailing transport element, and
　　wherein the minimal attainable transport spacing between the leading transport element and the trailing transport element is defined by a distance of corresponding reference points of the leading transport element and the trailing transport element that can be achieved by guiding the leading transport element and the trailing transport element at a closest possible distance to one another.

20. The plurality of transport elements of claim 19, wherein each of the plurality of transport elements comprises at least one gothic roller of a plurality of gothic rollers of the plurality of transport elements, wherein the plurality of transport elements are to be mounted movably on at least one guiding rail of the transport track via the plurality of gothic rollers, wherein each of the plurality of gothic rollers is divided into two halves along a symmetry plane perpendicular to a corresponding rotary axis of each of the plurality of gothic rollers, and wherein the two halves are mounted such that the two halves can rotate independently of one another.

* * * * *